United States Patent Office 3,579,397
Patented May 18, 1971

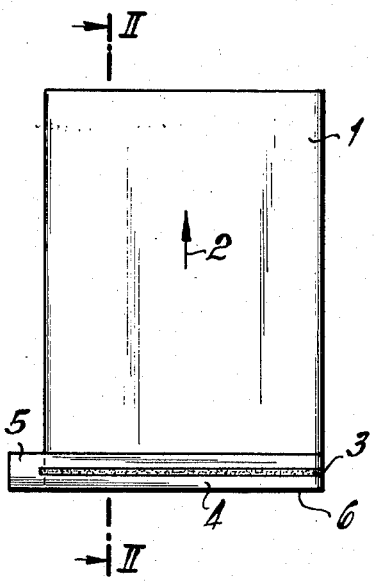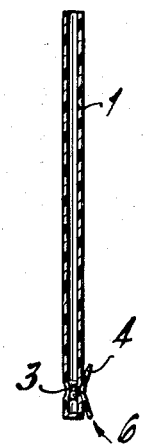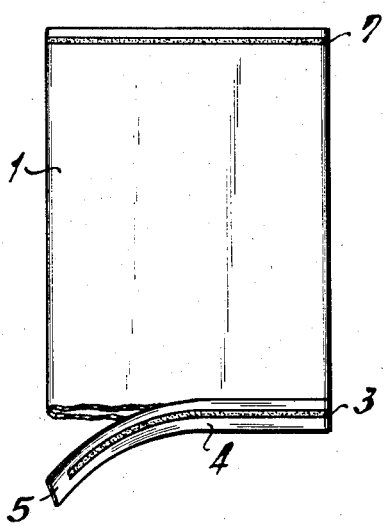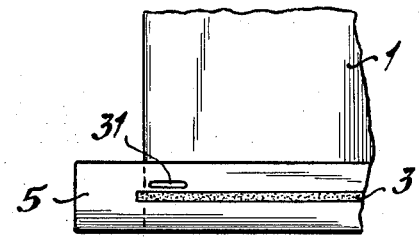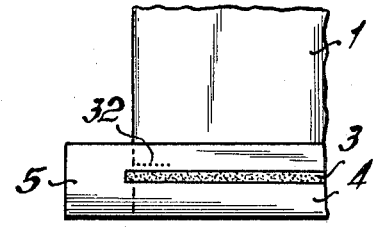

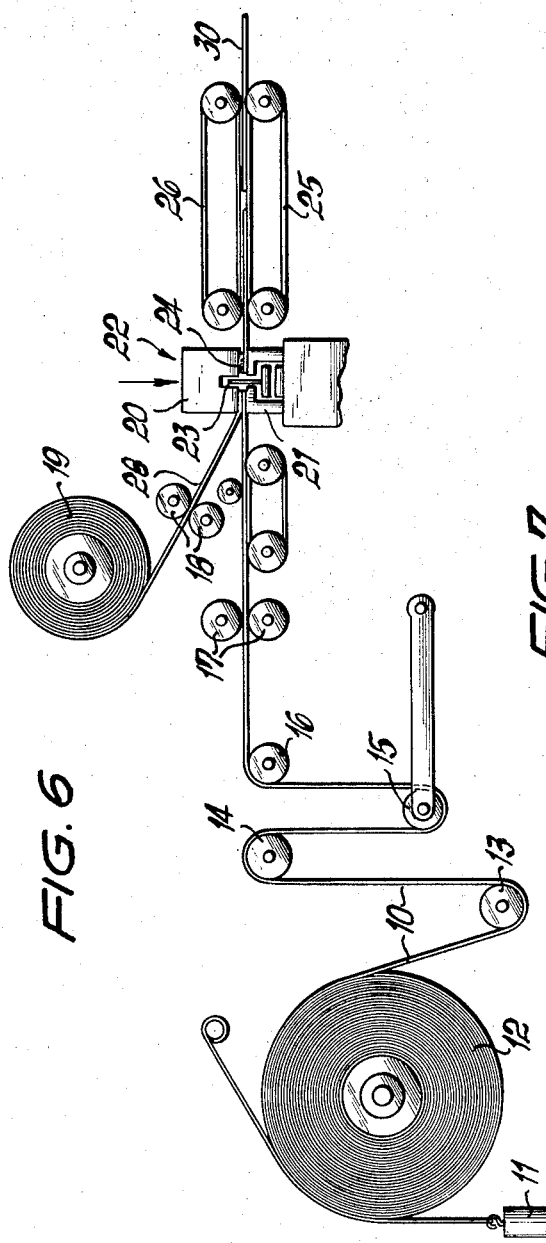
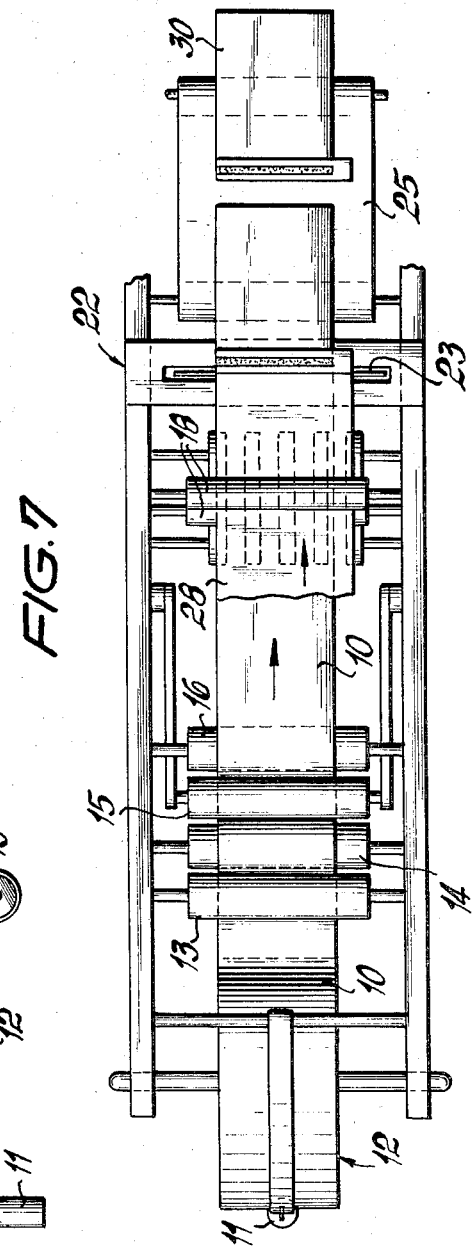

3,579,397
PROCESS OF MANUFACTURING BAGS HAVING TEAR STRIPS AND CONSISTING OF SYNTHETIC THERMOPLASTICS
August Schwarzkopf, Lengerich, Westphalia, Germany, assignor to Windmoller & Holscher, Westphalia, Germany
Filed Aug. 7, 1967, Ser. No. 658,928
Claims priority, application Germany, Aug. 16, 1966, W 42,222; June 20, 1967, W 44,214
Int. Cl. B32b 31/10
U.S. Cl. 156—251                                6 Claims

ABSTRACT OF THE DISCLOSURE

A tubing length portion corresponding to the length of the desired bag, and flat sheeting in a length portion corresponding to the desired width of the tear strip, are fed during each cycle of the machine between the jaws of a transverse heat sealing and cutting station, the width of the flat sheeting exceeds the width of the tubing by the length of the tear tab. A transverse heat-sealed seam joining the tubing walls and the flat sheeting is formed during the working stroke of the heat sealing and cutting device. A transverse severing cut is effected at the same time at a small distance from the heat-sealed seam and behind the same in the direction of travel.

---

Bags are known which consist of synthetic thermoplastic sheeting and are provided with tear strips to facilitate the opening of the bags. So far, it has been necessary to attach the tear strips by manual labor or with highly complicated machinery. It is an object of the invention to provide a process which can be carried out in a simple manner and without expensive additional equipment and which enables the provision of a tear strip at the top end of a bag to be filled from the bottom end, said tear strip being provided simultaneously with the top end seam.

According to the invention this object is accomplished in that a tubing length portion corresponding to the length of the desired bag, and flat sheeting in a length portion corresponding to the desired width of the tear strip, are fed during each cycle of the machine between the jaws of a transverse heat sealing and cutting station, the width of the flat sheeting exceeding the width of the tubing by the length of the tear tab, a transverse heat-sealed seam joining the tubing walls and the flat sheeting is formed during the working stroke of the heat sealing and cutting device and a transverse severing cut is effected at the same time at a small distance from the heat-sealed seam and behind the same in the direction of travel. The tubing coming from a supply roll is fed to a main feeding station for the withdrawal and determination of the respective section length. The main feeding station feeds the tubing in the required length between the jaws of the transverse heat sealing and cutting station and through that station until the tubing is stopped when it protrudes from the transverse heat sealing and cutting station approximately by the desired bag length. During the feeding stroke of the tubing, a further, small measuring and feeding device is operated so that a flat film having the thickness which is desired for the tear strip is withdrawn from another supply roll and fed between the pair of heat sealing jaws in an amount which corresponds to the width of the tear strip. The sheeting for the tear strip protrudes on one side from an edge of the tubing to such an extent that the protruding portion forms the required tear strip.

As viewed from the supply rolls, the heat sealing jaws are disposed in the transverse heat sealing station in such a manner that the line of cut is formed first and the heat sealing line is formed behind the line of cut, toward the delivery station, each finished bag being delivered with an open leading end whereas the transverse seam of the bag having the heat-sealed tear strip is disposed at the subsequent trailing end. The tubing having been fed in steps corresponding to bag lengths and the strip which has been fed in strip widths have been jointly cut by the transverse severing element and have been jointly heat-sealed by the transverse heat sealing jaws in this condition.

In a further development of the invention, the tubing may be provided below the transverse heat-sealed seam, where the tear tab is attached, with a short weakened line, which extends along the transverse heat-sealed seam from the side fold line of the tubing. As a result, the tearing operation can be initiated in a more effective manner and more easily from the corner which is to be torn open and from which the tear tab protrudes. The weakened line may consist of a hot-embossed line, adjacent to which the structure of the plastics material has been changed, or of a short needle prick line.

According to another improvement according to the invention, the tear strip may consist of a material which has a higher strength and toughness than the bag sheeting. A material having a higher tear strength may be selected, which is laminated with the plastics material forming the bag sheeting e.g., polyester laminated with polyethylene or textile fabrics coated with polyethylene may be used.

The invention will be explained more fully in the following description with reference to the drawings, which show embodiments by way of example. In the drawings.

FIG. 1 is a top plan view showing a tear-open bag made according to the invention.

FIG. 2 shows the bag of FIG. 1 in a section taken on line II—II of FIG. 1.

FIG. 3 shows a filled and subsequently closed bag which has been opened with the aid of the tear strip.

FIG. 4 shows the tear-open corner of a modified embodiment of a tear-open bag made according to the invention.

FIG. 5 shows the tear-open corner of a second modified embodiment.

FIG. 6 is a side elevation showing diagrammatically a machine which is suitable for making bags by the process according to the invention.

FIG. 7 is a top plan view associated with FIG. 6.

During its processing according to the invention to form a bag having a tear strip, the tube section is fed in the direction of the arrow 2. At its trailing end, the tube section 1 is closed by a heat-sealed seam 3. During the formation of the heat-sealed seam 3, a tear strip 4 is heat-sealed to the outside of the tube section on one side thereof. A portion 5 of the tear strip 4 protrudes from the bag to form a tear tab. Behind the heat-sealed seam 3, the tear strip 4 has a termination 6 which is flush with the tube section so that the tube section and the tear strip can be jointly severed at this point from the tubing and from the flat sheeting which is used for making the tear strips.

When the bag provided with the tear strip has been filled, it is closed by a heat-sealed closing seam 7 (FIG. 3). When it is desired to take contents from the bag, the tab 5 of the tear strip 4 is gripped and the latter is pulled from the bag so that the entire heat-sealed seam 3 is removed from the bag together with the tear strip and the bag is thus formed with an opening through which the bag can be emptied.

In the modified embodiment shown in FIG. 4, the hot-embossed line 31 is provided before the heat-sealed seam 3. In a bag having the usual design, with the tear strip on top, this line is disposed below said seam. The line 31 is formed by a heat sealing tool which has a corresponding design adjacent to the tear-open corner. The resulting change in the structure of the plastics material has weakened the bag sheeting so that the tearing operation can be initiated more easily. In the embodiment shown in FIG. 5, the hot-embossed line 31 is replaced by a short needle prick line 32 for the same purpose. In both cases, the tear strip 4 consists of such a material that it has a higher toughness and tear strength than the tube section 1. The tear strip may consist, e.g., of textile fabrics laminated with polyethylene if the tube section 1 consists of polyethylene.

The apparatus shown in the drawing for use in the manufacture of bags as shown in FIGS. 1 to 5 operates as follows:

The tubing supply roll 12 braked by a weight 11 supplies tubing 10, which travels around the two deflecting rollers 13 and 14, the dancer roll 15 and a third deflecting roller 16 to the main feeding station 17. During each cycle of the machine, said station 17 pulls a tubing portion having the length of the desired bag. In this way, the length of the bag is determined. In synchronism with the main feeding device 17, the strip-feeding device 18 advances flat sheeting from the supply roll 19 by an amount which corresponds to the width of the desired tear strip.

The tubing and the flat film are jointly fed between the heat sealing jaws 20 and 21 of the heat sealing station 22. The tubing protrudes substantially over the heat sealing jaws. During the standstill of the feeding devices 17 and 18, the heat sealing jaws are closed and the knife 23 extending transversely to the direction of travel cuts through the flattened tubing and the flat sheeting. At the same time the halves of the tubing and the strip are joined by heat sealing at 24. The heat sealing jaws 20 and 21 are not heated in their left-hand portion in the drawing. When the jaws have been opened, the delivery belts 25, 26 remove the finished bag 30 from the heat sealing station and carry it to the delivery station.

In the top plan view shown in FIG. 7, the same reference characters are used. It is also apparent from FIG. 7 that the tubing 10 is narrower to the extent of the tear tab 5 (FIG. 1) than the flat sheeting 28.

What is claimed is:
1. A method of manufacturing bags of synthetic thermoplastic material having tear strips with a free end tab sealed thereon, said method comprising the steps of intermittently moving flattened tubing of thermoplastic material along a first predetermined path of travel, intermittently moving a flat web of thermoplastic material, whose width exceeds the width of said tubing by the desired length of said end tab, along a second predetermined path of travel being at least for a part thereof parallel and adjacent to said first path of travel, moving, with each moving cycle, a length of said tubing corresponding to the desired bag length along said first path of travel and a length of said flat web corresponding to the desired width of said tear strip along said second path of travel, simultaneously heat-sealing said tubing and said flat web together in one heat-sealed seam and at the same time severing said tubing and said flat web parallel to but spaced from said heat-sealed seam upstream thereof.

2. A method as defined in claim 1, wherein a short weakened line extending parallel to but spaced from said heat-sealed seam is made in said tubing and said tear strip adjacent to said end tab.

3. A process according to claim 2, characterized in that the weakened line consists of a hot-embossed line.

4. A process according to claim 2, characterized in that the weakened line consists of a short needle prick line.

5. A process according to claim 1, characterized in that the tear strip consists of a material which has a higher strength and toughness than the material of the bag sheeting.

6. A process according to claim 5, characterized in that the tear strip consists of a high-strength material which is laminated with the plastics material of which the bag consists.

References Cited
UNITED STATES PATENTS

| | | | |
|---|---|---|---|
| 2,554,160 | 5/1951 | Von Gunten | 229—51(AS) |
| 3,191,507 | 6/1965 | Cowie | 229—51(AS) |
| 3,272,424 | 9/1966 | Rodney | 229—51(AS) |

VERLIN R. PENDEGRASS, Primary Examiner

U.S. Cl. X.R.

229—51